United States Patent [19]
Kazmierczak et al.

[11] Patent Number: 6,055,123
[45] Date of Patent: Apr. 25, 2000

[54] RADIALLY LOADED DISC MOUNTING SYSTEM FOR A DISC DRIVE

[75] Inventors: Frederick Frank Kazmierczak, San Jose; Michael John Raffetto, Scotts Valley, both of Calif.

[73] Assignee: Seagate Technology, Inc., Scotts Valley, Calif.

[21] Appl. No.: 08/931,808

[22] Filed: Sep. 16, 1997

[51] Int. Cl.⁷ .................................................. G11B 17/038
[52] U.S. Cl. ..................................... 360/98.08; 360/99.12
[58] Field of Search ............................... 360/98.08, 99.12

[56] References Cited

U.S. PATENT DOCUMENTS

| | | | |
|---|---|---|---|
| 4,091,454 | 5/1978 | Kauffmann | 360/135 |
| 4,754,351 | 6/1988 | Wright | 360/98.08 |
| 4,764,828 | 8/1988 | Gollbach | 360/98.08 |
| 4,819,105 | 4/1989 | Edwards | 360/98.08 |
| 5,006,942 | 4/1991 | Brooks et al. | 360/98.08 |
| 5,267,106 | 11/1993 | Brue et al. | 360/98.08 |
| 5,659,443 | 8/1997 | Berberich | 360/98.08 |
| 5,715,114 | 2/1998 | Gotou | 360/98.08 |

FOREIGN PATENT DOCUMENTS

| | | |
|---|---|---|
| 1-021779 | 1/1989 | Japan . |
| 1-179284 | 7/1989 | Japan . |
| 3-242857 | 10/1991 | Japan . |

*Primary Examiner*—William Klimowicz
*Attorney, Agent, or Firm*—Edward P. Heller, III; Raghunath S. Minisandram

[57] ABSTRACT

A disc mounting system for mounting the discs of a disc drive in a fixed radial relationship to the hub of a spindle motor. The disc mounting system includes curved spring elements, having a substantially C-shaped axial cross section, which are curved on a radius greater than the radius of the central opening of the discs. One or more spring elements are utilized with each disc, and assembly tooling is used to bend the spring elements so that the discs, with the opening of the C-shaped springs engaging the inner diameter of the discs, can fit over the hub of the spindle motor. The assembly tooling is then removed to allow the spring elements to partially straighten, firmly engaging the discs relative to the spindle motor hub in the radial direction. In a first embodiment of the invention, alternative mechanisms are disclosed for establishing the axial positions of the discs. In a second embodiment, a plurality of annular grooves are provided in the spindle motor hub and the spring elements engage both the discs and annular grooves in the spindle motor hub to fixedly locate the discs relative to the spindle motor hub in both the radial and axial directions. Fabrication of the spring elements from a shape-memory alloy is also disclosed.

12 Claims, 14 Drawing Sheets

RADIALLY LOADED DISC MOUNTING SYSTEM FOR A DISC DRIVE

FIELD OF THE INVENTION

This invention relates generally to the field of hard disc drive data storage devices, and more particularly, but not by way of limitation, to a new system for mounting the discs to the hub of a spindle motor in a disc drive.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

Disc drives of the current generation are included in desk-top computer systems for office and home environments, as well as in laptop computers which, because of their portability, can be used wherever they can be transported. Because of this wide range of operating environments, the computer systems, as well as the disc drives incorporated in them, must be capable of reliable operation over a wide range of ambient temperatures.

Furthermore, laptop computers in particular can be expected to be subjected to large amounts of mechanical shock as they are moved about. It is common in the industry, therefore, that disc drives be specified to operate over ambient temperature ranges of from, for instance, −5° C. to 60° C., and further be specified to be capable of withstanding operating mechanical shocks of 100 G or greater without becoming inoperable.

One of the areas of disc drive design which is of particular concern when considering ambient temperature variations and mechanical shock resistance is the system used to mount the discs to the spindle motor. During manufacture, the discs are mounted to the spindle motor in a temperature- and cleanliness-controlled environment. Once mechanical assembly of the disc drive is completed, special servo-writers are used to prerecord servo information on the discs. This servo information is used during operation of the disc drive to control the positioning of the actuator used to move the read/write heads to the desired data location in a manner well known in the industry. Once the servo information has been recorded on the discs, it is assumed by the servo logic that the servo information, and all data subsequently recorded, are on circular tracks that are concentric with relation to the spin axis of the spindle motor. The discs, therefore, must be mounted to the spindle motor in a manner that prevents shifting of the discs relative to the spindle motor due to differential thermal expansion of the discs and motor components over the specified temperature range, or due to mechanical shock applied to the host computer system.

Several systems for clamping of the discs to the spindle motor have been described in U.S. Patents, including U.S. Pat. No. 5,528,434, issued Jun. 18, 1996, U.S. Pat. No. 5,517,376, issued May 14, 1996, U.S. Pat. No. 5,452,157, issued Sep. 19, 1995, U.S. Pat. No. 5,333,080, issued Jul. 26, 1994, U.S. Pat. No. 5,274,517, issued Dec. 28, 1993 and U.S Pat. No. 5,295,030, issued Mar. 15, 1994, all assigned to the assignee of the present invention and all incorporated herein by reference. In each of these incorporated disc clamping systems, the spindle motor of the disc drive includes a disc mounting flange extending radially from the lower end of the spindle motor hub. A first disc is placed over the hub during assembly and brought to rest on this disc mounting flange. An arrangement of disc spacers and additional discs are then alternately placed over the spindle motor hub until the intended "disc stack" is formed. Finally, some type of disc clamp is attached to the spindle motor hub which exerts an axial clamping force against the uppermost disc in the disc stack. This axial clamping force is passed through the discs and disc spacers and squeezes the disc stack between the disc clamp and the disc mounting flange on the spindle motor hub.

From the above description, it would appear that the only element that would need to be considered when designing a disc clamping system would be the disc clamp, with any requirement for additional clamping force being met by an increase in the strength of the disc clamp. However, with the industry trend of size reduction in the overall disc drive, the size of various components within the disc drive has also been reduced, including the thickness of the discs. As the discs have grown thinner, the amount of clamping force that can be applied to the discs without causing mechanical distortion of the discs has also fallen. That is, due to inescapable tolerance variation in the flatness of the disc mounting flange on the spindle motor, the discs themselves and the disc spacers between adjacent discs, as well as the yield strength of the disc material, only a finite amount of axial clamping force can be applied to the inner diameters of the discs before the desired flatness of the disc surfaces is lost.

Furthermore, the amount of non-operating mechanical shock which the disc drive is specified to withstand is constantly being increased, with future disc drive products being considered which must be capable of operating after experiencing non-operating mechanical shocks in the range of 1000 G.

In light of these facts, it is clear that the currently common practice of axially loading the disc stack to prevent shifting of the discs relative to the spindle motor hub has nearly reached its maximum useful extreme, and a new system for mounting the discs to the spindle motor hub must be provided.

SUMMARY OF THE INVENTION

The present invention is a disc mounting system for mounting the discs of a disc drive in a fixed radial relationship to the hub of a spindle motor. The disc mounting system includes curved spring elements, having a substantially C-shaped axial cross section, which are curved on a radius greater than the radius of the central opening of the discs. One or more spring elements are utilized with each disc, and assembly tooling is used to bend the spring elements so that the discs, with the opening of the C-shaped springs engaging the inner diameter of the discs, can fit over the hub of the spindle motor. The assembly tooling is then removed to allow the spring elements to partially straighten, firmly engaging the discs relative to the spindle motor hub in the radial direction. In a first embodiment of the invention, alternative mechanisms are disclosed for establishing the axial positions of the discs. In a second embodiment, a plurality of annular grooves are provided in the spindle motor hub and the spring elements engage both the discs and annular grooves in the spindle motor hub to fixedly locate the discs relative to the spindle motor hub in both the radial and axial directions. Fabrication of the spring elements from a shape-memory alloy is also discussed.

It is a object of the invention to provide a system for mounting the discs in a disc stack to the hub of a spindle motor used to rotate the discs in a disc drive.

It is another object of the invention to provide a disc mounting system which prevents shifting of the discs relative to the hub of the spindle motor due to differential thermal expansion.

It is another object of the invention to provide a disc mounting system which prevents shifting of the discs relative to the hub of the spindle motor due to the applications of large mechanical shocks.

It is another object of the invention to provide a disc mounting system that is suitable for use in a high volume manufacturing operation.

It is another object of the invention to provide a disc mounting system that can be implemented in a high volume manufacturing operation in an economical manner.

The manner in which these objects are achieved, as well as other features and benefits of the invention, can best be understood by a review of the following DETAILED DESCRIPTION OF THE INVENTION, when read in conjunction with an examination of the accompanying drawings.

BRIEF DESCRIPTION OF THE DRAWINGS

FIGS. 2-1 and 2-2 are simplified sectional elevation views of typical prior art disc mounting systems which utilize only axial loading to secure the discs.

FIGS. 7-1 through 7-4 are plan views illustrating steps in the assembly of a disc drive incorporating a first embodiment of the present invention.

FIGS. 10-1 and 10-2 are top and bottom perspective views, respectively, of an intermediate disc spacer which is a portion of one variation of the first embodiment of the present invention.

FIGS. 12-1 and 12-2 are detail sectional views illustrating the final assembled relationship between components of one variation of the first embodiment of the present invention.

FIGS. 14-1 through 14-3 are plan views illustrating steps in the assembly of a disc drive incorporating a second embodiment of the present invention.

FIGS. 16-1 and 16-2 are detail sectional views illustrating the final assembled relationship between components of the second embodiment of the present invention.

FIGS. 17-1 and 17-2 are detail sectional views illustrating a variation of the disc mounting system of the second embodiment of FIGS. 16-1 and 16-2.

DETAILED DESCRIPTION OF THE INVENTION

Figure 1:
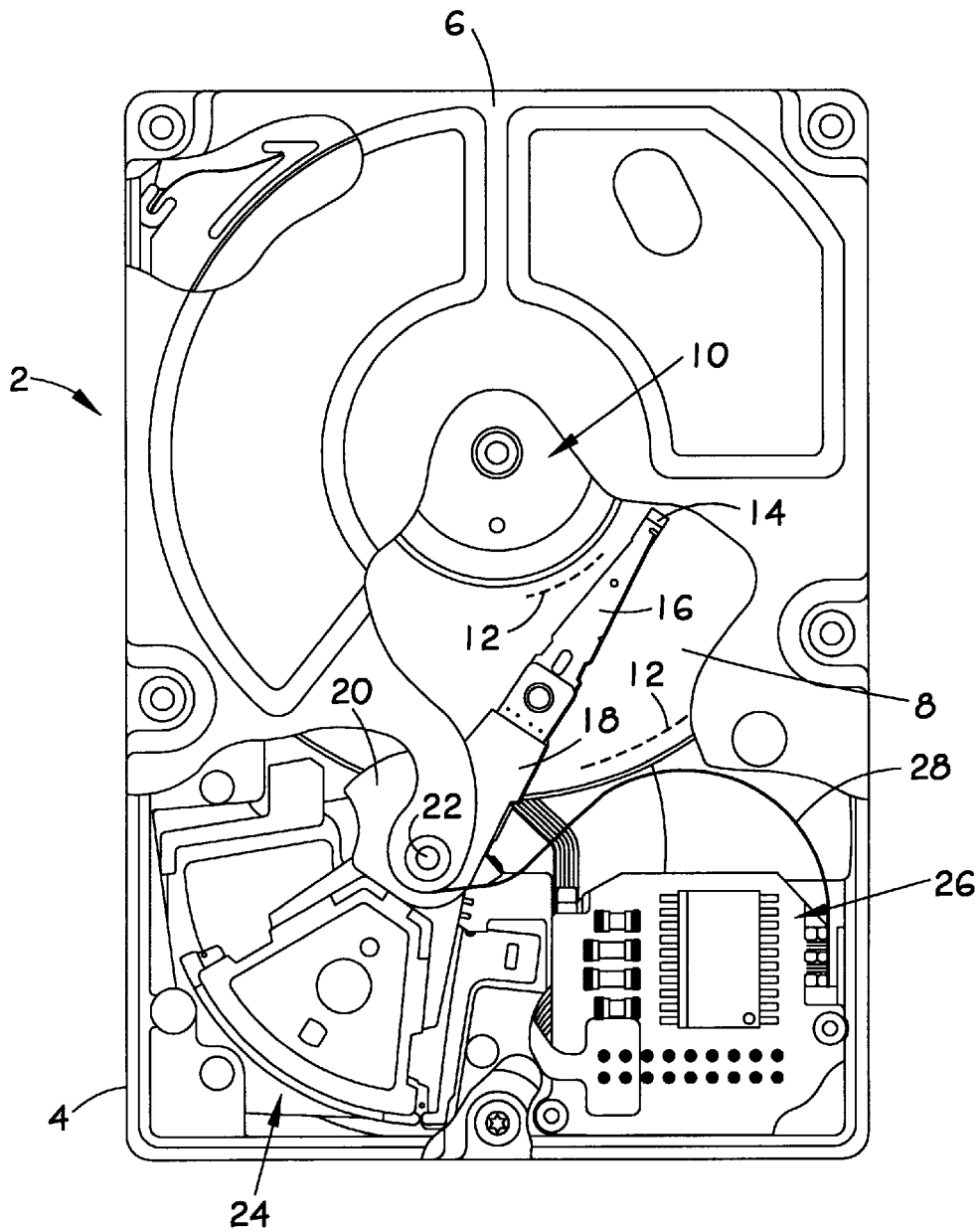
FIG. 1 is a top plan view of a prior art disc drive in which the present invention is particularly useful.

Turning now the drawings and specifically to FIG. 1, shown is a plan view of a disc drive 2 in which the present invention is particularly useful. The disc drive 2 includes a base member 4 to which all other components are directly or indirectly mounted and a top cover 6 (shown in partial cutaway) which, together with the base member 4, forms a disc drive housing which encloses delicate internal components and isolates these components from external contaminants.

The disc drive includes a plurality of discs 8 which are mounted for rotation on a spindle motor shown generally at 10. The discs 8 include on their surfaces a plurality of circular, concentric data tracks, the innermost and outermost of which are shown by dashed lines at 12, on which data are recorded via an array of vertically aligned head assemblies (one of which is shown at 14). The head assemblies 14 are supported by head suspensions, or flexures 16, which are attached to actuator head mounting arms 18. The actuator head mounting arms 18 are integral to an actuator bearing housing 20 which is mounted via an array of ball bearing assemblies (not designated) for rotation about a pivot shaft 22.

Power to drive the actuator bearing housing 20 in its rotation about the pivot shaft 22 is provided by a voice coil motor (VCM) shown generally at 24. The VCM 24 consists of a coil (not separately designated) which is supported by the actuator bearing housing 20 within the magnetic field of an array of permanent magnets (also not separately designated) which are fixedly mounted to the base member 4, all in a manner well known in the industry. Electronic circuitry (partially shown at 26, generally, and partially carried on a printed circuit board (not shown)) to control all aspects of the operation of the disc drive 2 is provided, with control signals to drive the VCM 24, as well as data signals to and from the heads 14, carried between the electronic circuitry and the moving actuator assembly via a flexible printed circuit cable (PCC) 28.

Figures 1, 2:
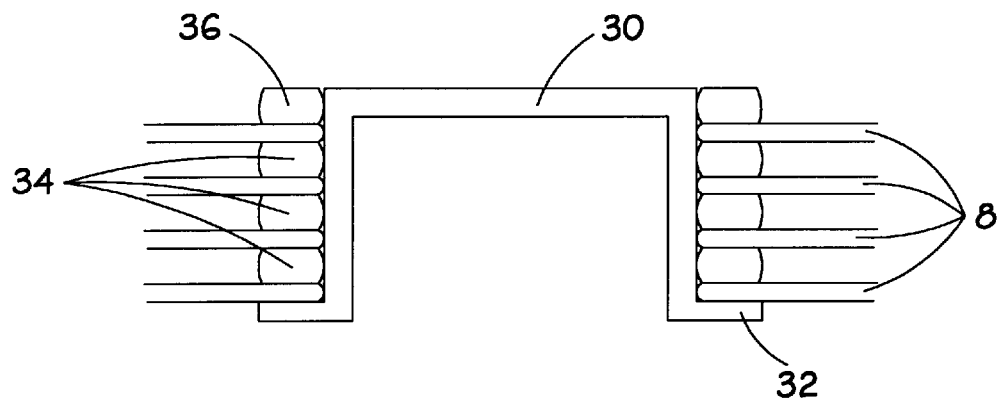
Figure 2:
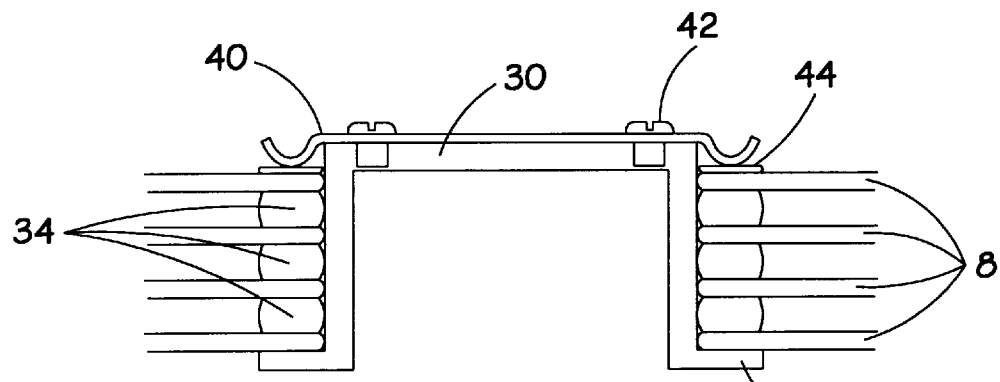

FIG. 2-1 is a simplified sectional elevation view of a typical prior art disc mounting system which utilizes axial loading to secure the discs. The figure shows a hub 30 of a spindle motor having a radially extending disc mounting flange 32 at its lower extreme. The hub 30 is substantially cup-shaped, being closed at the upper end and open at the lower end. The person of skill in the art will appreciate that the electrical and magnetic components (not shown) to rotate the hub 30 would typically be located within the hub.

FIG. 2-1 also shows a plurality of discs 8 and disc spacers 34. The disc stack is assembled by placing a first disc 8 over the hub 30 to rest against the disc mounting flange 32. The stack is formed by then alternately placing disc spacers 34 and discs 8 over the hub until the intended number of discs 8 have been positioned. A disc clamp 36 is then assembled to the uppermost portion of the hub 30 to complete the assembly. While the figure shows an example disc stack which includes four discs, the person of skill in the art will appreciate that the scope of the present invention includes disc stacks having both greater and lesser numbers of discs.

In FIG. 2-1, the disc clamp 36 is of the type referred to in the industry as a "shrink-fit" clamp. Such clamps have an inner diameter that is nominally smaller than the outer diameter of the hub 30. Assembly is accomplished by heating the clamp 36 to cause thermal expansion great enough to allow the clamp 36 to pass over the hub 30. The designed amount of axial loading is then applied to the disc clamp 36 and the clamp 36 is allowed to cool and shrink into interference fit with the hub 30.

Turning now to FIG. 2-2, shown is a simplified diagrammatic sectional elevation view, similar to that of FIG. 2-1, showing a second prior art disc clamping system. FIG. 2-2 shows a spindle motor hub 30 incorporating a disc mounting flange 32 similar to that shown in FIG. 2-1, and a stack of discs 8 and disc spacers 34, also similar to those of FIG. 2-1.

FIG. 2-2 shows a disc clamp 40 of the type known in the industry as a "spring clamp". Such spring disc clamps 40 are typically formed from flat sheet stock having the desired spring characteristics and include circumferential corrugations closely adjacent the outer diameter of the disc clamp which form a contact surface (not designated) for exerting force to the disc stack when a plurality of screws 42 are assembled through the disc clamp 40 into threaded holes (also not designated) in the hub 30. It is also typical for disc clamping systems incorporating such spring disc clamps 40 to include a washer member 44 between the contact surface of the disc clamp 40 and the upper surface of the uppermost disc 8. This washer member 44 aids in evenly distributing the clamping force of the disc clamp 40 about the circumference of the mounting portion of the discs 8 and allows for slip contact between the contact surface of the disc clamp 40 and the washer member 44 when the screws 42 are tightened, thus preventing the exertion of radial stresses directly to the uppermost disc 8.

Selection of the material and geometry of the disc clamp 40 will determine the amount of axial clamping force exerted by the disc clamping system of FIG. 2-2, as will be appreciated by persons of skill in the art. Details of typical disc clamping systems incorporating a spring clamp such as that of FIG. 2-2 can be found in previously incorporated U.S. Pat. Nos. 5,274,517 and 5,295,030.

Both of these two prior art disc clamping systems share a common drawback. Specifically, since the inner diameter of the discs must be at least slightly larger than the outer diameter of the spindle motor hub to allow for assembly ease, the discs are subject to radial displacement relative to the spindle motor hub after assembly due to differential thermal expansion and applied mechanical shocks. And, since all clamping forces applied to the disc stack are in the axial direction, all resistance to such radial shifting of the discs relative to the spindle motor hub is, therefore, purely a function of the amount of applied axial force and the coefficient of friction of the disc stack components. As previously noted hereinabove, with the continuing market trend for higher and higher mechanical shock tolerances, such purely axially loaded disc mounting systems are becoming unsatisfactory.

Figure 3:
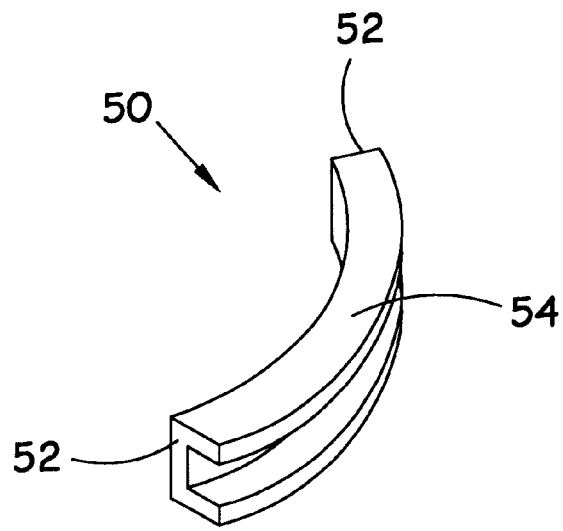
FIG. 3 is a perspective view of a spring element that is a portion of the present invention.

FIG. 3 is a perspective view of a spring element 50 which is a major component in all embodiments of the present invention. The spring element 50 is substantially C-shaped in axial cross section i.e., a cross section defined by a plane extending in parallel with through the spin axis of the spindle motor) and curved along its length. As will be explained in detail below, the radius of the curve of the spring element 50 is greater than the radius of the central opening, or inner diameter, of the discs in the disc drive in which the present invention is implemented.

The spring element 50 can be seen to include end portions 52 and a middle portion 54. The end portions 52 and middle portion 54 are particularly important from a functional viewpoint, as will be seen below in the discussions of how the spring element 50 interacts with other elements of the disc drive to implement the invention.

It is presently envisioned that the spring element will be fabricated from 300 series stainless steel, but any material having the desired spring characteristics, as will be described below, is envisioned as falling with the scope of the present invention. Furthermore, certain materials having shape-memory characteristics are particularly envisioned as being suitable for the spring element 50, as will also be discussed below.

Figure 4:
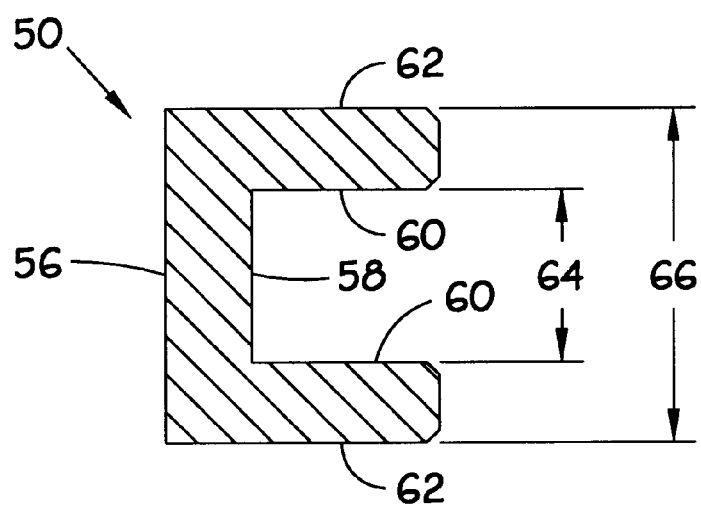
FIG. 4 is a detail axial cross sectional view of the spring element of FIG. 3 identifying specific features of the spring element.

FIG. 4 is an axial cross sectional view of the spring element 50, and is presented to identify specific features and surfaces of the spring element 50. In particular, the spring element 50 can be seen to include an inner radial surface 56 and an outer radial surface 58. The terms "inner" and "outer" in these designators relates to the center of a disc stack mounted on the hub of a spindle motor. These radial surfaces 56, 58 will interact with the spindle motor hub and the inner diameter of the discs in a manner to be discussed below.

The spring element also includes inner axial surfaces 60 and outer axial surfaces 62. The inner axial surfaces 60 are separated by an inner axial dimension 64 selected to interact cooperatively with the thickness of the discs, while the outer axial surfaces 62 are separated by an outer axial dimension 66, the size of which will be determined by certain other aspects of the implementation of the invention, as will be described in detail below.

Figure 5:
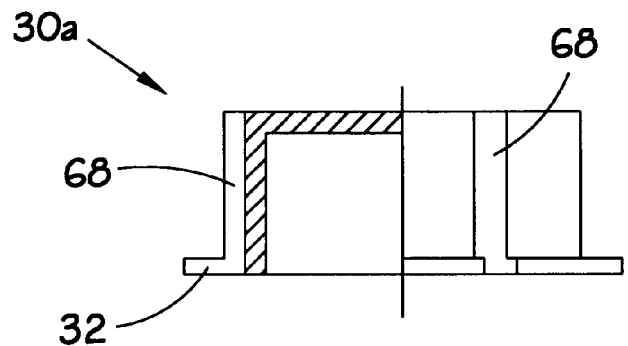
FIG. 5 is an elevation view, partially in section, of a spindle motor hub which has been modified in accordance with a first embodiment of the present invention.

FIG. 5 is an elevation view, partially in section, of a spindle motor hub 30a which has been modified in accordance with a first embodiment of the present invention. Specifically, the left half of FIG. 5 shows the spindle motor hub 30a in section, while the right half of the figure shows the spindle motor hub 30a in elevation view.

The spindle motor hub 30a includes a radially extending disc mounting flange 32, similar to the disc mounting flange 32 of the prior art FIGS. 2-1 and 2-2. The principle difference between the inventive spindle motor hub 30a of FIG. 5 and the prior art spindle motor hub 30 of FIGS. 2-1 and 2-2 is the addition of axially extending tooling features 68 distributed about the periphery of the spindle motor hub 30a. These tooling features 68 are used in conjunction with a complementary number of assembly tools, to be described below, to facilitate the assembly of a disc drive incorporating the present invention, as will also be discussed below. The specific number of tooling features 68 included in the spindle motor hub 30a is dependent on the particular embodiment of the present invention implemented in the disc drive, and is not considered as limiting to the scope of the present invention.

Figure 6:
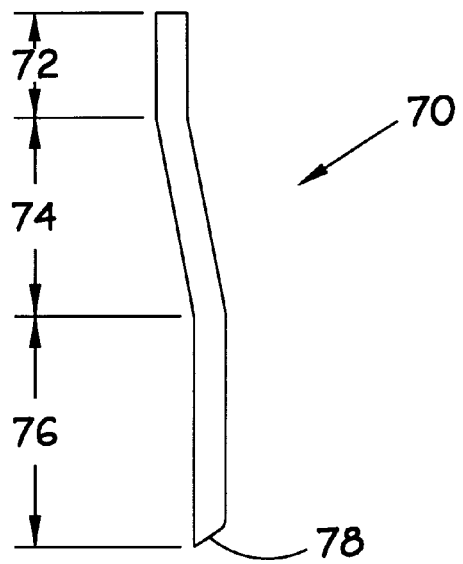
FIG. 6 is an elevation view of an assembly tool utilized in the manufacture of a disc drive incorporating the present invention.

FIG. 6 is an elevation view of an assembly tool 70 used to facilitate assembly of a disc drive incorporating certain embodiments of the present invention. The assembly tool 70 includes a pre-mounting portion 72, a ramp portion 74 and a hub portion 76 which acts cooperatively with the tooling features 68 in the spindle motor hub. When employed during the assembly of a disc drive using the present invention, the hub portion 76 of the assembly tool 70 is inserted into the tooling feature 68 in the spindle motor hub and the pre-mounting portion 72 is positioned toward the center of the spindle motor hub. At the lowest end of the hub portion 76, the assembly tool includes a beveled end 78. The manner in which the assembly tool 70 is used to facilitate assembly will be discussed below.

Figures 1, 7:
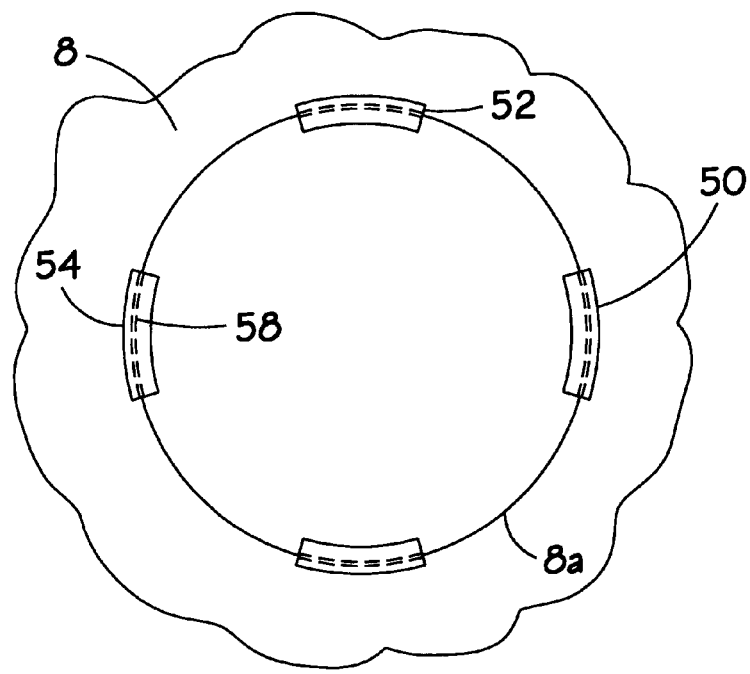
Figures 2, 7:
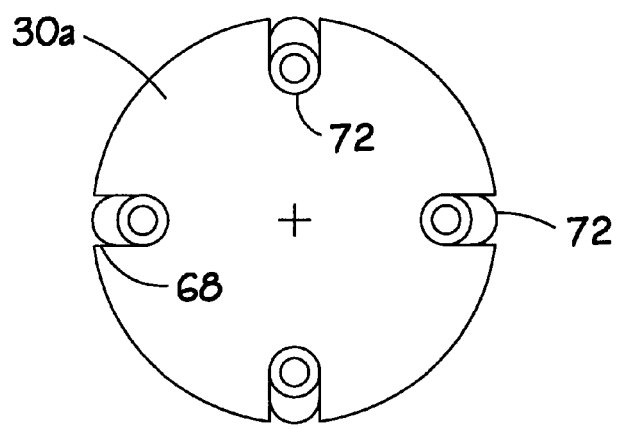
Figures 3, 7:
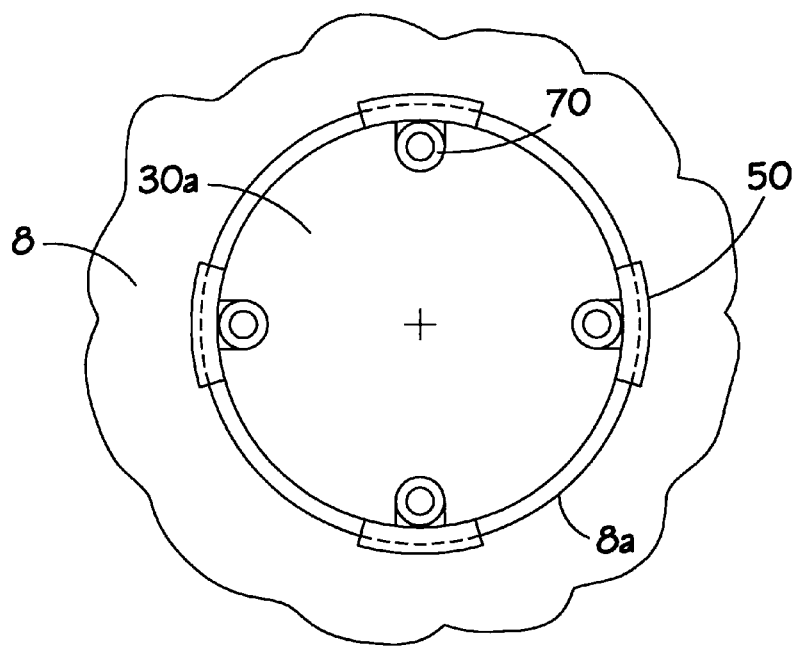
Figures 4, 7:
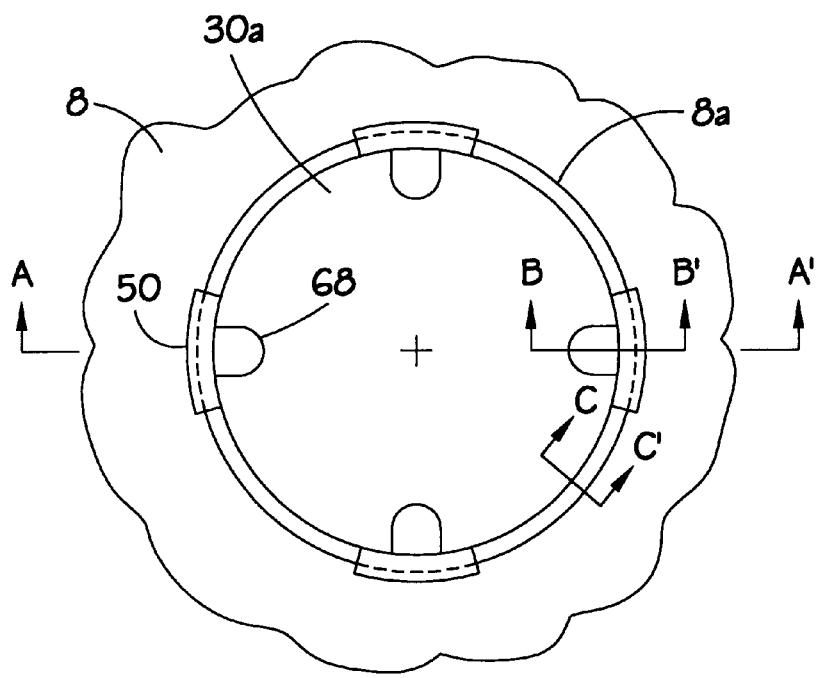

FIGS. 7-1 through 7-4 are plan views of various elements of the disc drive showing their relationships during assembly. In FIG. 7-1, a portion of a disc 8 is shown, including the central opening 8a. The figure also shows a plurality of spring elements 50 equally spaced about the central opening 8a of the disc 8. While the figure specifically shows four spring elements 50, a person of skill in the art will realize that the particular number of spring elements 50 is a matter of design choice, and should not be considered as limiting to the scope of the invention.

In FIG. 7-1 it can be seen that the spring elements have been placed over the inner edge of the disc 8. Because, as previously noted, the radius of the spring elements 50 is greater than the radius of the central opening 8a in the disc 8, the outer radial surface 58 of the spring elements 50 contacts the disc 8 only at the end portions 52 of the spring elements 50, and is not in contact with the disc 8 in the middle portion 54 of the spring elements 50.

FIG. 7-2 shows a spindle motor hub 30a similar to that shown in FIG. 5. The spindle motor hub 30a includes a plurality of axially extending tooling features 68 distributed about the outer diameter of the hub 30a. In the example shown in FIG. 7-2, there are four tooling features 68 to cooperate with the four spring elements 50 of FIG. 7-1, but the person of skill in the art will appreciate that the actual number of tooling features 68 will be dependent on the number of spring elements 50 included in the particular implementation, and, as such is not considered as limiting to the invention.

FIG. 7-2 also shows an assembly tool 70, such as that of FIG. 6, inserted in each of the tooling features 68. The assembly tools 70 are positioned in the tooling features 68 with their pre-mounting portions (72 in FIG. 6) rotated to lie toward the center of the spindle motor hub 30a. Thus the ramp portion (74 in FIG. 6) slopes radially outward as it extends from the pre-mounting portion 72 to the hub portion 76 which engages the tooling features 68. Thus, the radially outermost surfaces of the combined assembly tools 70 form a first, small diameter cylinder at the pre-mounting portions 72 connected to a conical portion in the area of the ramp portions 74 which increases in diameter from the pre-mounting portion 72 to the hub portions 76. The radially outermost surfaces of the hub portions 76 extends slightly beyond the outer diameter of the spindle motor hub 30a in the region of the tooling features 68.

Assembly is accomplished by placing the disc 8, with spring elements 50 installed on the inner diameter of the disc as in FIG. 7-1, over the assembly tools 70, and lowering the disc 8 until the middle portions (54 in FIG. 3) of the inner radial surfaces of the spring elements (56 in FIG. 4) contact the ramp portions 74 of the assembly tools 70. The disc 8 is then pressed downward toward the spindle motor hub 30a. As the disc 8 is pressed downward, the spring elements 50 are bent outward until, when the disc 8 reaches the hub portions 76 of the assembly tools 70, the innermost portions of the spring elements 50 lie outside the diameter of the spindle motor hub 30a. This component relationship is shown in FIG. 7-3.

FIG. 7-3 shows the disc 8 with the spring elements 50 bent outward by contact with the hub portions of the assembly tools 70 to an extent where the spring elements 50 can pass over the spindle motor hub 30a. In this position, the outer radial surface (58 in FIG. 4) of the spring elements 50 are bent into substantial contact with the inner diameter 8a of the disc 8. Once the disc mounting system components are in this relationship, the disc 8 can be pressed downward along the hub portions 76 of the assembly tools 70 to the desired axial position on the spindle motor hub. Example embodiments of component relationships for determining the axial position of the discs on the spindle motor hub 30a will be discussed below.

FIG. 7-4 shows the final assembled relationship of components. In FIG. 7-4, the assembly tools (70 in FIGS. 7-2 and 7-3) have been axially withdrawn from their engagement with the tooling features 68 of the spindle motor hub 30a. As the assembly tools 70 are pulled from the hub 30a, the beveled ends (78 in FIG. 6) of the assembly tools 70 allow the spring elements 50 to straighten. As the spring elements 50 straighten, the middle portion (54 in FIG. 3) of the inner radial surfaces (56 in FIG. 4) of the spring elements 50 come into contact with the outer diameter of the spindle motor hub 30a in the region of the tooling features 68. Meanwhile, contact is maintained between the outer radial surface (58 in FIG. 4) of the spring elements 50 and the disc 8 in the area of the end portions (52 in FIG. 3) of the spring elements 50. Fixed radial positioning of the disc 8 relative to the spindle motor hub 30a is established by contact between the middle portion 54 of the spring elements 50 and the spindle motor hub 30a, and by contact between the end portions 52 of the spring elements and the inner diameter 8a of the disc 8.

Figure 8:
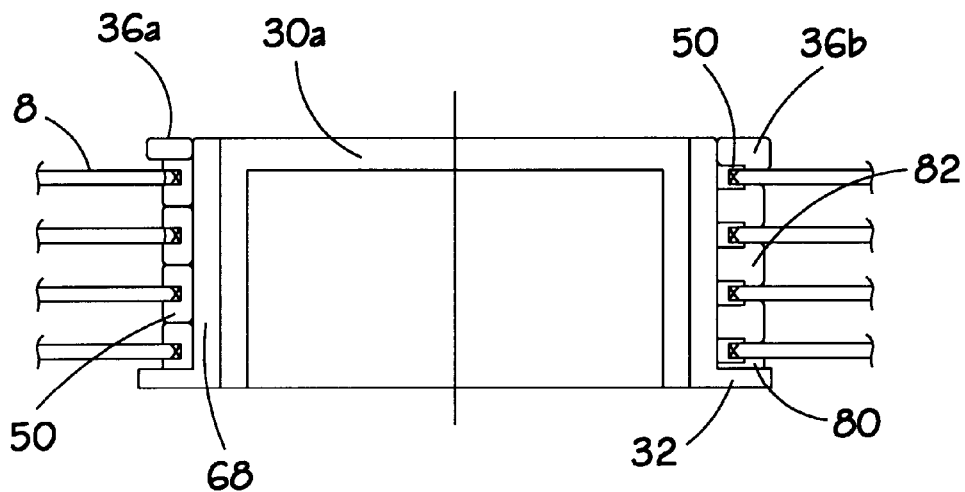
FIG. 8 is a simplified sectional elevation view of a disc stack assembly, illustrating two variations of the first embodiment of the present invention.

FIG. 8 is a sectional elevation view of a disc stack taken along line A—A' of FIG. 7-4 showing two alternatives for establishing the axial position of the discs 8 relative to the spindle motor hub 30a. In both alternatives, the spindle motor hub 30a includes a radially extending disc mounting flange 32 similar to the prior art hub 30 of FIGS. 2-1 and 2-2.

On the left side of FIG. 8, it can be seen that the axial dimensions (66 in FIG. 4) of the spring elements 50 have been selected to establish the desired inter-disc spacing. That is, the lowermost disc 8 is pressed downward until the spring elements 50 come into contact with the disc mounting flange 32, and subsequent discs are pressed downward until the spring elements 50 associated with the discs 8 contact the spring elements 50 of the next-lower disc 8 in the disc stack. Finally, a disc clamp 36a is mounted to the uppermost portion of the spindle motor hub 30a. The disc clamp 36a is of the shrink-fit type previously described in relationship to prior art FIG. 2-1, but could also be a spring-type disc clamp as described in relationship to prior art FIG. 2-2. The significant difference between the disc mounting system illustrated on the left side of FIG. 8 and the prior art of FIGS. 2-1 and 2-2 is that the disc clamp 36a only has to provide sufficient axial loading to meet the axial shock requirement of the disc drive, and all radial positioning of the discs is established and maintained by the spring elements 50.

One potential drawback to the disc mounting system shown on the left side of FIG. 8 is that the discs 8 are only supported by the spring elements 50 and are free-floating between the spring elements 50. While this disc mounting system may be entirely adequate for some disc drives, other disc drives may require more support of the discs about the diameter of the spindle motor 30a.

The right side of FIG. 8 shows an alternative disc mounting system which provides additional axial support of the discs 8 relative to the spindle motor hub 30a. The disc mounting system of the right side of FIG. 8 includes spring elements 50 operating as previously described in relationship to FIGS. 7-1 through 7-4 above. That is, the spring elements 50 contact the spindle motor hub 30a in the area of the tooling features 68 and also contact and radially position the discs 8 relative to the spindle motor hub 30a.

The disc mounting system shown on the right side of FIG. 8 also includes a specially configured bottom disc spacer 80, a plurality of specially configured intermediate disc spacers 82 and a specially configured disc clamp 36b. The features of the bottom disc spacer 80, intermediate disc spacers and disc clamp 36b will be described in detail, and the assembled relationship of these components will then be described below.

Figure 9:
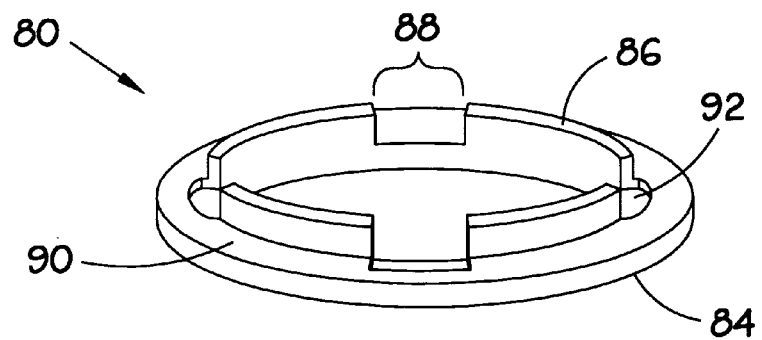
FIG. 9 is a top perspective view of a bottom disc spacer which is a portion of one variation of the first embodiment of the present invention.

FIG. 9 is a top perspective view of a bottom disc spacer 80 used in the disc mounting system of the right side of FIG. 8. The bottom disc clamp 80 includes a flat bottom surface 84 intended for cooperative engagement with the upper surface of the disc mounting flange (32 in FIG. 8). The bottom disc spacer 80 also includes an axially extending inner wall 86 interrupted at intervals by notches 88 intended to interact with the spring elements 50. In the example configuration shown, there are four notches for cooperation with a complementary number of spring elements, such as the configuration of components shown in FIGS. 7-1 through 7-4. A person of skill in the art will, however, appreciate that the specific number of spring elements 50, and thus notches 88 is a matter of design choice and should not be considered as limiting to the scope of the invention.

The bottom disc spacer 80 also includes a disc contact surface 90 intended to engage the inner portion of the discs 8 as shown on the right side of FIG. 8. The disc contact surface 90 includes an appropriate number of recesses 92 associated with the notches 88 to accommodate the spring elements 50.

Figures 1, 10:
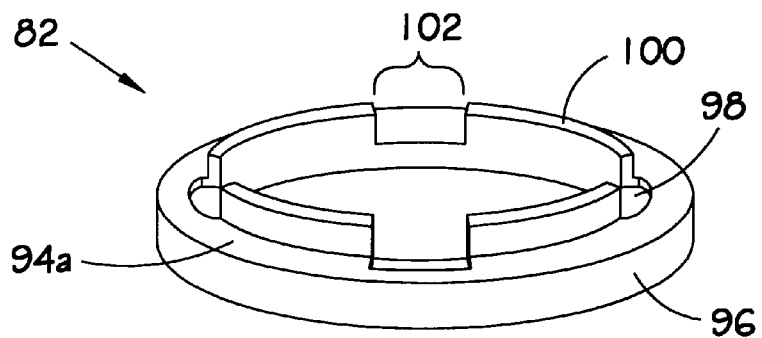
Figures 2, 10:
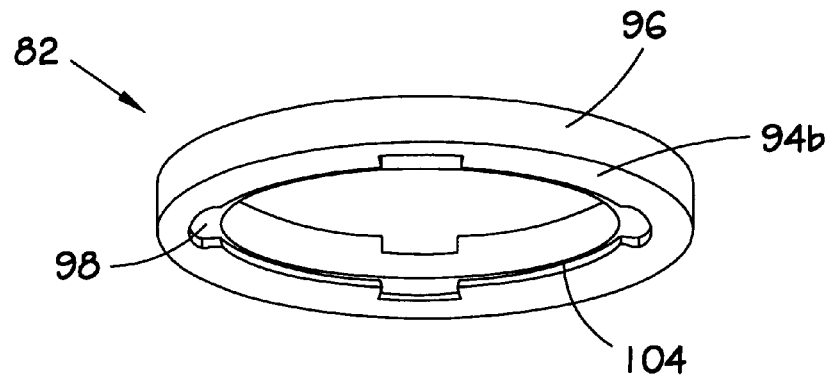

FIGS. 10-1 and 10-2 are top and bottom perspective views, respectively, of an intermediate disc spacer 82. In the figures it can be seen that the intermediate disc spacer 82 includes an upper disc contact surface 94a and a lower disc contact surface 94b separated by a vertical wall 96 dimensioned to provide the desired amount of inter-disc spacing. Both the upper and lower disc contact surfaces 94a, 94b include an appropriate number of recesses 98 to accommodate the spring elements 50.

The intermediate disc spacer 82 also includes an axially extending inner wall 100, similar to the inner wall 86 of the bottom disc spacer 80 of FIG. 9. The inner wall 100 of the intermediate disc spacer 82 is also interrupted at intervals by notches 102, similar in configuration and function to the notches 88 in the inner wall 86 of the bottom disc spacer 80 of FIG. 9.

Finally, the intermediate disc spacer 82 includes an annular step 104. This annular step 104 is intended for cooperation with the top of the inner wall of the next lower element in the disc stack, as will be described below.

Figure 11:
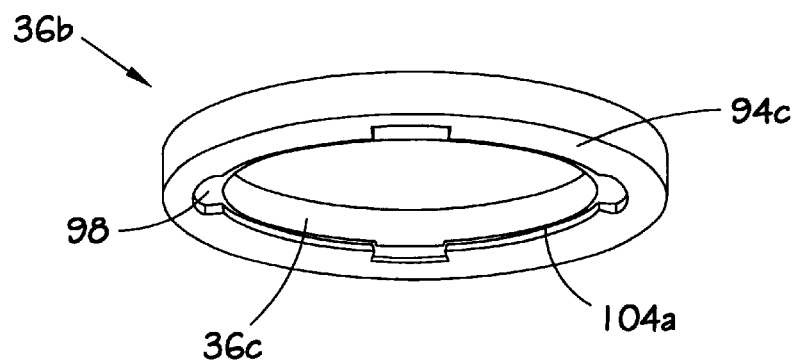
FIG. 11 is a bottom perspective view of a shrink-fit disc clamp which is a portion of one variation of the first embodiment of the present invention.

FIG. 11 is a bottom perspective view of a disc clamp 36b which is the final component in the disc mounting system of the right side of FIG. 8. Again, the disc clamp 36b is a shrink-fit type disc clamp, and thus has an inner diameter 36c which is nominally smaller than the outer diameter of the spindle motor hub to which it is intended to mount. Assembly is accomplished by first heating the disc clamp 36b to cause it to expand, placing the disc clamp 36b over the spindle motor hub into its intended position and allowing the disc clamp 36b to cool and contract into contact with the outer diameter of the spindle motor hub. It should be noted that the bottom disc spacer 80 of FIG. 9 and the intermediate disc spacer 82 of FIGS. 10-1 and 10-2 have an inner diameter which is nominally slightly larger than the outer diameter of the spindle motor hub to allow ease of assembly.

The disc clamp 36b has a lower surface configured similarly to the intermediate disc spacer 82. That is, the disc clamp 36b includes a disc contact surface 94c interrupted by an appropriate number of recesses 98 to cooperate with the spring elements 50, and an annular step for cooperation with the inner wall of the disc spacer below the disc clamp 36b in the disc stack. The manner in which the components of the disc mounting system of the right side of FIG. 8 interact in their assembled condition will now be described.

Figures 1, 12:
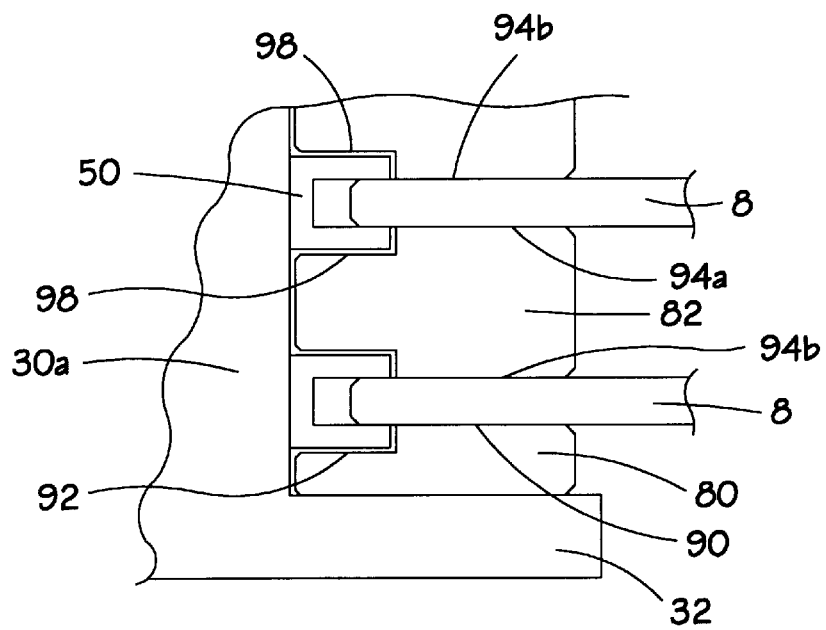
Figures 2, 12:
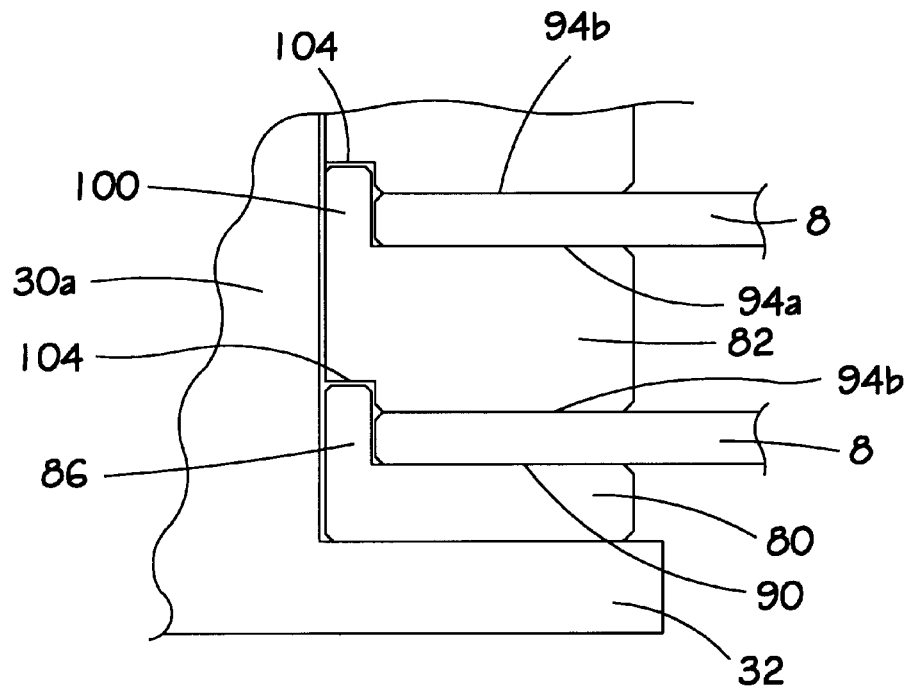

FIGS. 12-1 and 12-2 are detail sectional views, taken along lines B—B' and C—C', respectively, of FIG. 7-4, showing the interaction of the disc stack components of the disc mounting system of the right side of FIG. 8.

FIG. 12-1 shows a sectional view through the middle portion of the spring elements 50, and shows that the inner radial surfaces (56 in FIG. 4) of the spring elements 50 are in direct contact with the spindle motor hub 30a. The bottom disc spacer 80 is seen to rest directly on the disc mounting flange 32 of the spindle motor hub 30a.

The discs 8 are axially positioned by contact between the discs 8 and the disc contact surfaces 90, 94a, 94b of the bottom and intermediate disc spacers 80, 82. As can be seen in the figure, the recesses 92, 98 in the disc contact surfaces 90, 94a, 94b are dimensioned to allow clearance between the disc spacers 80, 82 and the spring elements 50. This spacing ensures that axial positioning of the discs 8 is controlled only by contact between the discs and the disc contact surfaces 90, 94a, 94b of the disc spacers 80, 82.

Although it appears that the inner diameters of the discs 8 are not radially constrained by the spring elements 50 in FIG. 12-1, it should be recalled that FIG. 12-1 is taken along line B—B' of FIG. 7-4, and thus is showing the middle portion (54 in FIG. 3) of the spring elements 50. At the end portions (52 in FIG. 3) of the spring elements 50, the outer radial surface (58 in FIG. 4) will directly contact the inner diameters of the discs 8, radially positioning the discs 8 relative to the spindle motor hub.

FIG. 12-2 is a detail sectional view taken along line C—C' of FIG. 7-4, showing the relationship of the disc stack components in the area between spring elements 50. In the figure, it can be seen that the bottom disc spacer 80 rests directly on the disc mounting flange 32 of the spindle motor hub 30a, and that axial positioning of the discs 8 is determined solely by contact between the discs and the disc contact surfaces 90, 94a, 94b of the bottom and intermediate disc spacers 80, 82.

FIG. 12-2 also shows that the inner walls 86, 100 of the bottom and intermediate disc spacers 80, 82 are radially dimensioned to not contact the inner diameter of the discs 8, or the spindle motor hub 30a. This is because the radial position of the discs 8 relative to the spindle motor hub is determined by the spring elements 50, and there must be some assembly dimensional tolerance to allow the disc spacers 80, 82 to be placed over the spindle motor hub 30a. Similarly, the inner walls 86, 100 and annular steps 104 in the intermediate disc spacers 82 are dimensioned to preclude direct contact, again ensuring that the axial positioning of the discs 8 relative to the spindle motor hub 30a is solely a function of the disc spacer disc contact surfaces 90, 94a, 94b.

One of skill in the art will appreciate that the bottom disc spacer 80 could be eliminated from the disc stack, thus reducing the overall height of the disc stack, if the disc mounting flange 32 were modified to include recesses to accommodate the spring elements on the lowermost disc 8 in the disc stack. Similarly, since the inner walls 86, 100 of the bottom and intermediate disc spacers do not contact adjacent elements in the disc stack other than the discs 8, the disc spacers 80, 82 could be fabricated without these features.

A person of skill in the art will also appreciate that either variation of the first embodiment of the invention can be implemented using a single spring element 50 for each disc. In such a configuration, a point on the inner diameter of the disc radially opposite the spring element will be biased into direct contact with the spindle motor hub. It should be pointed out, however, that such an approach will cause the disc to be mounted off-center to the spindle motor hub, potentially leading to an unbalancing of the disc stack. This unbalancing can, however, be compensated for in disc drives having more than one disc by circumferentially displacing the spring elements of each disc from the spring elements of other discs in the disc stack by an angle dependent on the number of discs. For instance, in a disc drive including two discs, the spring elements would be displaced 180 degrees from each other, while a disc drive having three discs would displace the spring elements by 120 degrees. Fine tuning of the balancing of the entire stack may require minor deviation from equiangular displacement of the spring members, or modification of the angular displacement of the spring element location dependent on the axial position of the associated disc. Such balancing is believed to be within the expertise of a person of normal skill in the art.

In another aspect of the present invention, it is envisioned that the spring elements 50 used to radially load the discs 8 relative to the spindle motor hub are fabricated from a shape-memory alloy (SMA). SMAs are well known in the industry, and are typically characterized by having two distinct crystalline states or phases, each of which is achieved at specific temperatures dependent on the exact alloy composition and the fabrication processes used in the manufacture of components. The first of these two phases, the martensitic phase, is characterized by occurring at a lower temperature range than the second, or austenitic, phase. The martensitic phase is also typically "weaker" or more malleable than the austenitic phase. The austenitic phase is sometimes referred to as the "trained" phase. If a SMA component is formed to a particular shape and heated to a transition temperature (dependent upon alloy composition) while held in that shape, the component forms with a "memory" of that shape. When allowed to cool, the material switches to the martensitic phase, and can be bent or deformed with relative ease. If the component is then heated to an activation temperature (again dependent on alloy composition), the component again transforms to its austenitic phase, and recovers the shape in which it was originally "trained". This phase and shape change is accomplished with a high level of force.

The applicability of SMAs to the present invention relates to the fabrication of the spring elements 50. If the spring elements 50 are formed and trained with a curvature greater than the radius of the inner diameter of the discs, and then allowed to cool, they can be mechanically shaped to conform to the radius of the inner diameter of the discs when mounted to the discs. In such condition, the springs will allow the discs, with the spring elements attached, to be readily placed over the hub of the spindle motor without the use of the assembly tools (70 in FIGS. 6, 7-2 and 7-3) as described above. Once the disc is positioned at its desired axial location relative to the spindle motor hub, the spring elements are heated to their activation temperature, and will straighten to recover their "memorized" shape. As the spring elements straighten, the inner radial surface (56 in FIG. 4) near the middle portion (54 in FIG. 3) of the spring element 50 will bear against the spindle motor hub, while the outer radial surface (58 in FIG. 4) near the end portions (52 in FIG. 3) of the spring elements 50 bears against the inner diameter of the discs, thus establishing a fixed radial loading of the discs relative to the spindle motor hub.

In a second major embodiment of the present invention, the disc mounting flange 32 of the spindle motor hub 30a can be eliminated entirely, thus providing a lower height for the disc stack, or allowing more discs to be mounted in the same vertical space. The features of this second major embodiment of the invention will now be discussed.

Figure 13:
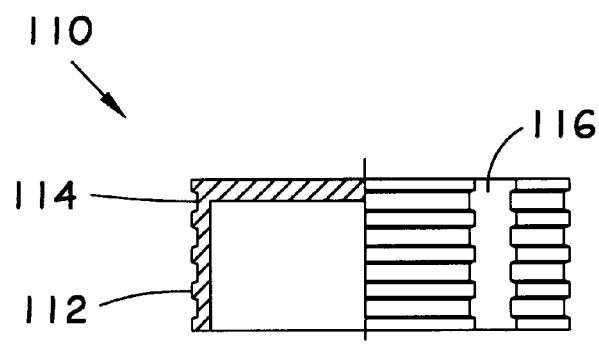
FIG. 13 is an elevation view, partially in section, of a spindle motor hub which has been modified in accordance with a second embodiment of the present invention.

FIG. 13 is an elevation view, partially in section, of a spindle motor hub 110 which is fabricated in accordance with a second embodiment of the present invention. As can be seen in the figure, the spindle motor hub 110 does not include a disc mounting flange as was present in the prior art spindle motor hubs 30 of FIGS. 2-1 and 2-2 and the spindle motor hub 30a of the first embodiment of the invention as illustrated in FIGS. 8, 12-1 and 12-2.

The outer diameter 112 of the spindle motor hub 110 is slightly smaller than the inner diameter of the discs to be mounted, as will be discussed in more detail below, and the spindle motor hub 110 includes a plurality of annular grooves 114 cast or machined into the hub 110. As will be illustrated below, the spindle motor hub 110 includes an annular groove 114 for each disc mounted to the spindle motor, and the axial and radial dimensions of the annular grooves are selected to interact with other elements of the disc mounting system in a manner which will also be discussed below.

FIG. 13 also shows that the spindle motor hub 110 includes a number of axially extending tooling features 116 distributed circumferentially about the outer diameter of the spindle motor hub 110. These tooling features are similar in form and function to the tooling features 68 in the previously described first embodiment, and are used in conjunction with the assembly tool 70 of FIG. 6 as will be described below.

Figures 1, 14:
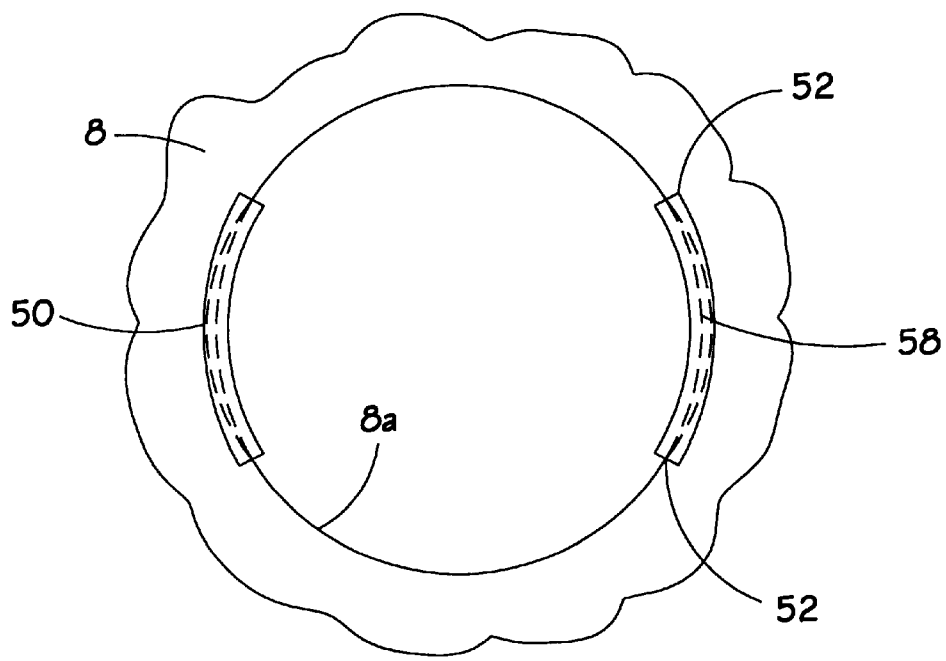
Figures 2, 14:
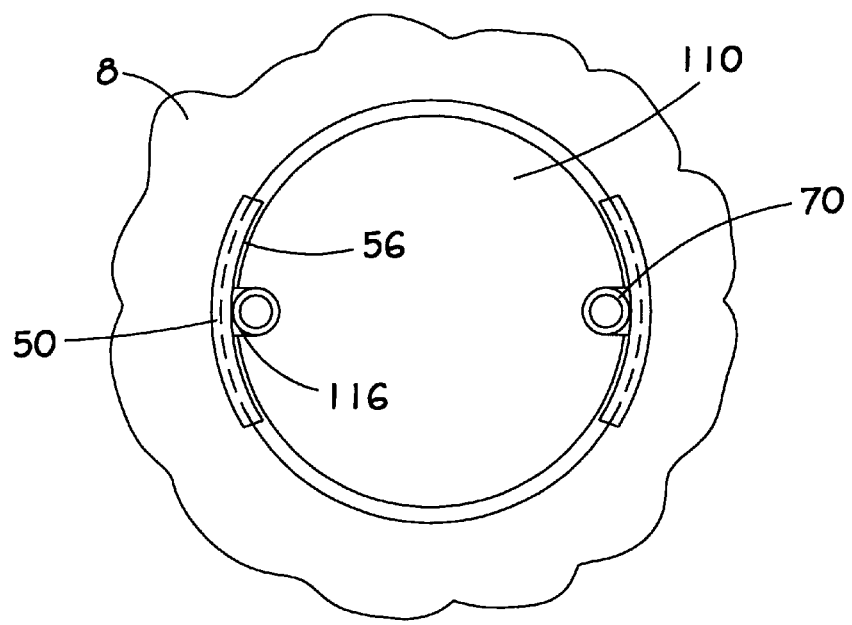
Figures 3, 14:
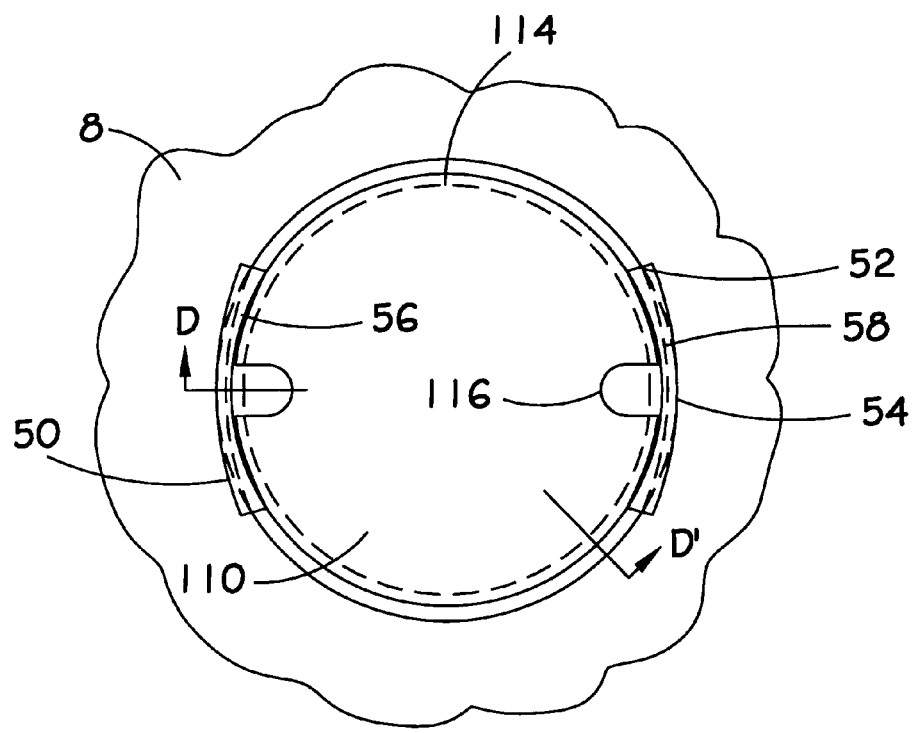

FIGS. 14-1 through 14-3 are plan views of various components of a disc drive incorporating the second embodiment of the present invention, showing their relationships during assembly. In FIG. 14-1, a portion of a disc 8 is shown with a pair of spring elements 50 engaged with the inner diameter 8a of the disc 8. Once again, a person of skill in the art will realize that the specific number of spring elements 50 will be determined by considerations related to the total disc drive design, and, as such, should not be considered as being limiting to the scope of the invention.

In FIG. 14-1, it can be seen that the spring elements have a curve radius greater than the radius of the inner diameter 8a of the disc 8, and, as such, the spring elements 50 are in contact with the inner diameter 8a of the disc 8 only at their end portions 52, while the outer radial surface 58 of the spring members 50 does not contact the disc 8 near the middle portions (54 in FIG. 3). As in the spring elements 50 of the previously described first embodiment, the spring elements have an internal axial dimension (64 in FIG. 4) selected to cooperate closely with the thickness of the disc 8.

FIG. 14-2 is a plan view similar to that of FIG. 7-3 and shows the relationship of disc drive components when the disc 8 with associated spring elements 50 has been placed over a pair of assembly tools 70 inserted in the tooling features 116 in the spindle motor hub 110 and pressed down until the spring elements 50 are in contact with the hub portions (76 in FIG. 6) of the assembly tools 70. In the example assembly shown, other centering apparatus must be included to ensure that the assembly tools 70 contact the spring elements 50 at the proper point to align the disc 8 with the spindle motor hub. If, however, three or more tooling features 116 and assembly tools 70 were to be used, the centering of the disc 8 relative to the spindle motor hub 110 would accomplished automatically.

FIG. 14-2 shows that when the discs 8 are axially positioned on the hub portion of the assembly tool 70, the inner radial surfaces 56 of the spring elements 50 have been displaced radially to a position radially outward of the outer diameter of the spindle motor hub 110, allowing the discs 8 with associated spring elements 50 to be axially positioned at the desired location on the spindle motor hub 110.

FIG. 14-3 shows the final assembled relationship between elements of the second embodiment of the invention. When the assembly tools (70 in FIG. 14-2) are removed from the tooling features 116 of the spindle motor hub 110, the spring elements 50 are allowed to straighten as the beveled ends (78 in FIG. 6) of the assembly tools 70 pass by the spring elements 50. As the spring elements 50 straighten, the inner radial surfaces 56 of the spring elements pass into and engage the annular grooves 114 in the spindle motor hub 110, thus establishing the axial position of the disc 8 relative to the spindle motor hub 110. Once again, as in the previously described first embodiment, the outer radial surfaces 58 of the spring elements 50 engage the discs 8 at the end portions 52 of the spring elements 50, providing radial positioning of the disc 8 relative to the spindle motor hub 110.

Figure 15:
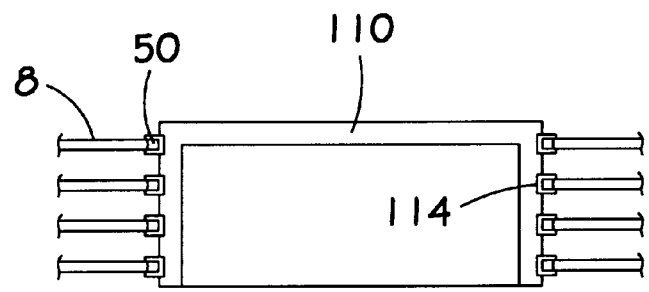
FIG. 15 is a simplified sectional elevation view of a disc stack assembly, illustrating the second embodiment of the present invention.

FIG. 15 is a simplified sectional elevation view, taken along line D—D' of FIG. 14-3, of a disc stack constructed in accordance with the second embodiment of the invention. As the figure shows, the discs are axially constrained by the spring elements 50 and the relationship between the spring elements 50 and the annular grooves 114 in the spindle motor hub 110. Details of the component relationships are shown in FIGS. 16-1 and 16-2 and described below.

Figures 1, 16:
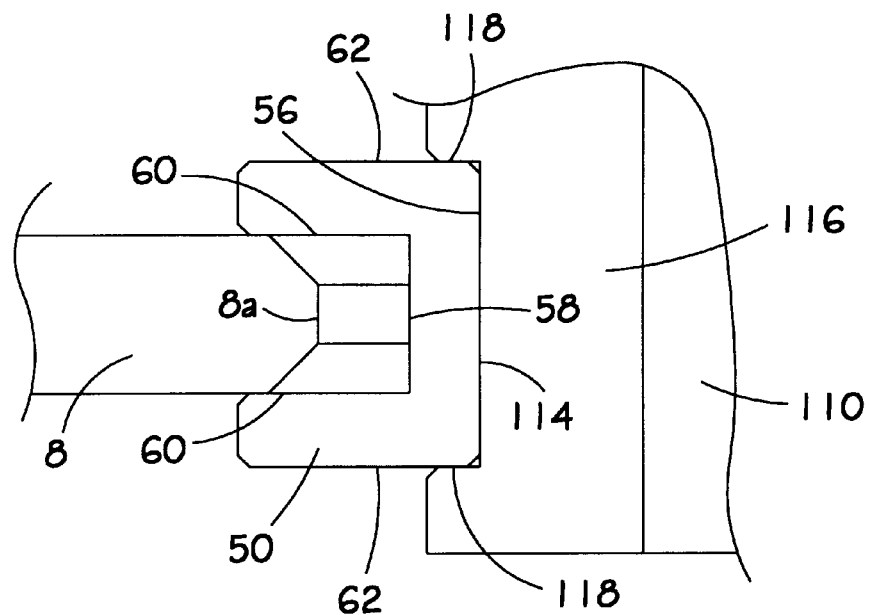
Figures 2, 16:
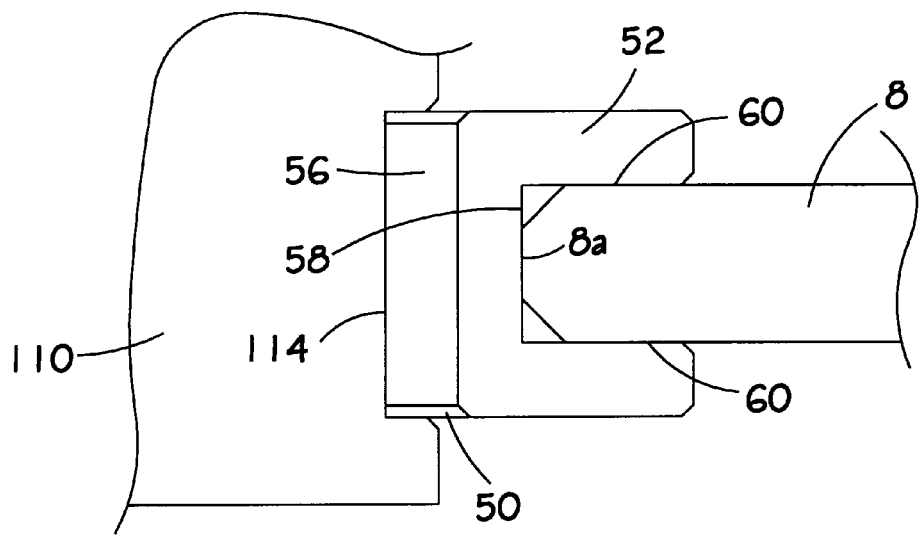

FIG. 16-1 shows in detail the relationship of components at the left side of FIG. 15, that is, at the end of the D—D' line of FIG. 14-3 closest to the D end. In the figure, it can be seen that the inner radial surface 56 of the spring element 50 rests in contact with the inner surface of the annular groove 114 in the area of the tooling feature 116 of the spindle motor hub 110. The outer axial surfaces 62 of the spring element 50 interact with cooperative axial surfaces 118 of the annular groove 114 to provide axial positioning of the disc 8, which is captured between the inner axial surfaces 60 of the spring element 50. Since FIG. 16-1 is a view at the middle portion (54 in FIG. 3) of the spring element 50, the inner diameter 8a of the disc 8 is radially displace from the outer radial surface 58 of the spring member 50.

FIG. 16-2 shows in detail the relationship of components at the right side of FIG. 15, that is, at the end of the D—D' line of FIG. 14-3 closest to the D' end. As can be seen in the figure, at the end portion 52 of the spring element 50 outer radial surface 58 of the spring element 50 directly contacts the inner diameter 8a of the disc 8. The inner radial surface 56 of the spring element 50 is radially displaced from the annular groove 114 in the spindle motor hub 110 at this circumferential location, but it should be recalled that the middle portion of the spring element 50 is firmly engaged with the annular groove 114. Once again it should be noted that the inner axial surfaces 60 of the spring element 50 directly contact the disc 8.

A person of skill in the art will appreciate that this second embodiment of the invention can also be implemented using spring elements 50 fabricated from SMA, as described hereinabove. In such an implementation, the discs, with SMA spring elements 50 mounted on their inner diameters, can be placed over the spindle motor hub 110 without the need for the assembly tools 70 and associated assembly features 116 in the spindle motor hub. Again, once the discs are positioned at their desired axial locations relative to the spindle motor hub 110, the spring elements 50 would then be heated to return the spring elements to their straighter memory condition, radially fixing the discs 8 in relationship to the spindle motor hub 110.

Figures 1, 17:
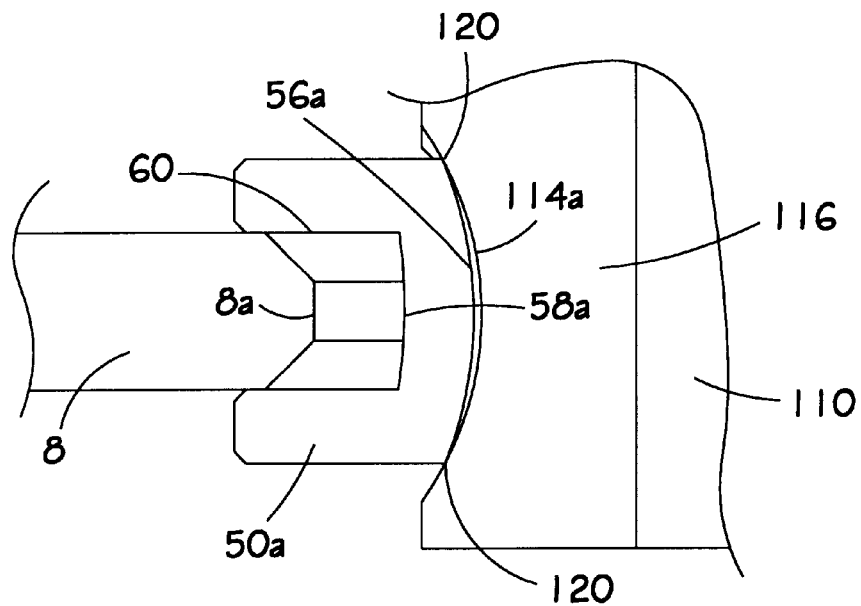
Figures 2, 17:
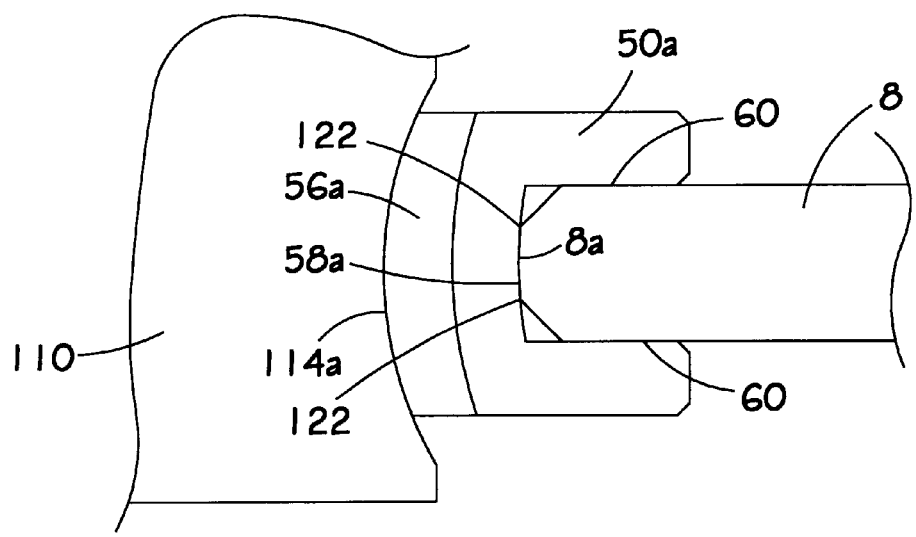

FIGS. 17-1 and 17-2 are detail sectional views of a variation of the second embodiment of the present invention. FIGS. 17-1 and 17-2 are similar to the views of FIGS. 16-1 and 16-2 discussed above. That is, FIG. 17-1 is a sectional view taken through the middle portion (54 in FIG. 3) of a spring element 50a in the region of the tooling feature 116 in the spindle motor hub 110, while FIG. 17-2 is a sectional view taken adjacent an end portion (52 in FIG. 3) of a spring element 50a.

In FIGS. 17-1 and 17-2, the annular grooves 114a in the spindle motor hub 110 have an arcuate shape, while the inner radial surface 56a and outer radial surface 58a of the spring element 50a are also formed in an arc. The arcs of the inner radial surface 56a and outer radial surface 58a are formed with a radius greater than the radius of the annular groove 114a. As can be seen in FIG. 17-1, this relationship between the arc radii of the inner radial surface 56a of the spring element 50a and the annular grooves 114a causes the spring elements 50*a* to directly contact the arc surface of the annular groove at only two points 120. Furthermore, this configuration also ensures that the spring elements 50*a* will be centered axially in the annular grooves 114*a*, and that the spring action of the spring elements 50*a* will serve to return the spring elements 50*a*, along with the associated disc 8, to a centered position in the annular groove should any axially applied mechanical shock tend to move the disc 8 and spring elements 50*a* away from the axially centered position in the annular groove.

Because FIG. 17-1 shows an axial cross section at the middle portion of the spring element 50*a*, the inner diameter 8*a* of the disc 8 can be seen to not contact the outer radial surface 58*a* of the spring element 50*a*, while the operative surfaces of the disc 8 are still constrained between the inner axial surfaces 60 of the spring element 50*a*.

FIG. 17-2 is a sectional view similar to that of FIG. 16-2. That is, it shows a sectional view of the spindle motor hub 110, spring element 50*a* and disc 8 near an end portion of the spring element 50*a*. In the figure, it can be seen that the inner radial surface 56*a* of the spring element 50*a* is radially spaced from the annular groove 114*a*, while the outer radial surface 58*a* of the spring element 50*a* directly bears on the inner diameter 8*a* of the disc 8. Because of the arcuate shape of the outer radial surface 58*a* of the spring element 50*a* actually contacts the inner diameter 8*a* of the disc 8 only at the two points 122, thus contributing to the axial centering of the disc 8 relative to the spring element 50*a*. Again, if the dimensional tolerance necessary to insert the disc 8 between the inner axial surfaces 60 of the spring element 50*a* were to allow axial shifting of the disc 8 relative to the spring element 50*a* due to axially applied mechanical shock, the spring action of the spring element 50*a* would work to return the disc 8 to an axially centered position relative to the spring element 50*a*. Thus from FIGS. 17-1 and 17-2, it is apparent that, since the disc 8 is fixedly located axially relative to the spring element 50*a*, and since the spring element 50*a* is fixedly located axially relatively to the annular groove 114*a* in the spindle motor hub 110, the axial position of the disc 8 relative to the spindle motor hub 110 is firmly established.

From the foregoing, it is apparent that the present invention is particularly well suited and well adapted to achieve the objects set forth hereinabove, as well as possessing other advantages inherent therein. While particular configurations of the present invention have been disclosed as example embodiments, certain variations and modifications which fall within the envisioned scope of the invention may be suggested to one of skill in the art upon reading this disclosure. Therefore, the scope of the present invention should be considered to be limited only by the following claims.

What is claimed is:

1. A disc drive including one or more discs mounted to a hub of a spindle motor and a disc mounting system for mounting the discs to the spindle motor hub comprising:

one or more spring elements, having a substantially C-shaped axial cross section and formed as an arc of a circle, having a curvature along their lengths, at an outer radial contact surface thereof, both before and after final assembly, greater than or equal to the radius of the inner diameter of the discs, mounted to the inner diameter of the discs with at least a portion of the open C-shaped axial cross section axially overlapping the inner diameters of the discs, the spring elements also including an inner radial surface near middle portions of the spring elements bearing directly against the spindle motor hub and the out radial contact surface near end portions of the spring elements bearing directly against the inner diameter of the discs to radially position the discs relative to the spindle motor hub.

2. A disc drive as claimed in claim 1, wherein the disc mounting system further comprises:

a radially extending disc mounting flange at a lower end of the spindle motor hub; and a disc clamp fixedly attached to an upper end of the spindle motor hub; and wherein the spring elements have an axial dimension selected to provide the desired amount of inter-disc spacing when spring elements associated with adjacent discs bear directly against one another.

3. A disc drive as claimed in claim 1, wherein the disc mounting system further comprises:

a radially extending disc mounting flange at a lower end of the spindle motor hub; and a disc clamp fixedly attached to an upper end of the spindle motor hub; and an appropriate number of disc spacers located between adjacent discs to provide a desired amount of Interdisc spacing.

4. A disc drive as claimed in claim 3 wherein the disc spacers have disc contact surfaces which bear directly on the surfaces of the discs and the disc contact surfaces include recesses for accommodating the spring elements.

5. A disc drive as claimed in claim 1 wherein the spindle motor hub is formed substantially as a continuous cylinder and includes an annular groove associated with each disc, and wherein the inner radial surface of the spring element bears against the spindle motor hub in the annular groove to establish the axial position of each disc relative to the spindle motor hub.

6. A disc drive as claimed in claim 1 wherein the spring elements are fabricated from a shape-memory alloy.

7. A disc mounting system for mounting one or more discs to a hub of a spindle motor in a disc drive, the disc mounting system comprising:

one or more spring elements, having a substantially C-shaped axial cross section and formed as an arc of a circle, having a curvature along their lengths, at an outer radial contact surface thereof, both before and after final assembly, greater than or equal to the radius of the inner diameter of the discs, mounted to the inner diameter of the discs with at least a portion of the open C-shaved axial cross section axially overlapping the inner diameters of the discs, the spring elements also including an inner radial surface near middle portions of the spring elements bearing directly against the spindle motor hub and the outer radial contact surface near end portions of the spring elements bearing directly against the inner diameter of the discs to radially position the discs relative to the spindle motor hub.

8. A disc mounting system as claimed in claim 7 further comprising:

a radially extending disc mounting flange at a lower end of the spindle motor hub; and a disc clamp fixedly attached to an upper end of the spindle motor hub; and wherein the spring elements have an axial dimension selected to provide the desired amount of inter-disc spacing when spring elements associated with adjacent discs bear directly against one another.

9. A disc mounting system as claimed in claim 7 further comprising:

a radially extending disc mounting flange at a lower end of the spindle motor hub; and a disc clamp fixedly attached to an upper end of the spindle motor hub; and an appropriate number of disc spacers located between adjacent discs to provide a desired amount of inter-disc spacing.

10. A disc mounting system as claimed in claim 9 wherein the disc spacers have disc contact surfaces which bear directly on the surfaces of the discs and the disc contact surfaces include recesses for accommodating the spring elements.

11. A disc mounting system as claimed in claim 7 wherein the spindle motor hub is formed substantially as a continuous cylinder and includes an annular groove associated with each disc, and wherein the inner radial surface of the spring element bears against the spindle motor hub in the annular groove to establish the axial position of each disc relative to the spindle motor hub.

12. A disc mounting system as claimed in claim 7 wherein the spring elements are fabricated from a shape-memory alloy.

* * * * *